United States Patent Office 3,590,071
Patented June 29, 1971

3,590,071
PRODUCTION OF BIS-HYDROXYALKYL ESTERS OF BENZENE DICARBOXYLIC ACIDS
Donald R. Larkin, Corpus Christi, Tex., assignor to Celanese Corporation, New York, N.Y.
No Drawing. Filed Feb. 16, 1968, Ser. No. 705,937
Int. Cl. C07c 69/82
U.S. Cl. 260—475P
14 Claims

ABSTRACT OF THE DISCLOSURE

The process for the production of bis-hydroxyalkyl phthalates by reacting an alkylene oxide with a benzene dicarboxylic acid in the presence of a catalyst and in a nitrobenzene or nitrotoluene reaction medium. For example ethylene oxide is reacted with terephthalic acid in a nitrobenzene reaction medium using a tertiary amine catalyst so as to produce bis(2-hydroxyethyl) terephthalate.

BACKGROUND OF THE INVENTION

The present invention relates to the production of bis-hydroxyalkyl esters of benzene dicarboxylic acids. More particularly the present invention relates to a novel and efficient process for the production of bis(2-hydroxyethyl) terephthalate.

The production of linear superpolyesters such as polyethylene terephthalate has become of significant commercial interest in recent years. One of the methods for forming these polyesters is by the polymerization of bis-hydroxyalkyl phthalates such as bis(2-hydroxyethyl) terephthalate. Probably best known and most widely used methods for producing these esters of benzene dicarboxylic acids are those in which the acid is suspended in an inert liquid medium and then reacted with an alkylene oxide in the presence of a catalyst. For example, see U.S. Pat. 3,037,049 which discloses the use of such liquid reaction mediums as aromatic hydrocarbons, ketones and cyclic ethers and which also discloses the use of tertiary amine catalysts. Also such patents as Belgian Pats. 666,527, 660,257, British Pats. 999,242, 1,029,669, German Pat. 1,157,623, French Pats. 1,415,134, 1,430,842, 1,408,874 and Netherlands Pats. 6413344, 6506200 and 6508415 disclose esterification processes wherein various reaction media such as hydrocarbons, halohydrocarbons, water, alcohols, nitriles and dimethyl formamide-water are disclosed and wherein such catalysts as phosphines, arsines, quaternary ammonium compounds, stibines, amino acids, alkali sulfates, alkali chlorides and alkali nitrates are used as catalysts. Even though all of these methods are satisfactory for producing bis-hydroxyalkyl esters of benzene dicarboxylic acids, research is continually underway for new and efficient methods for the production of these diesters.

SUMMARY

It is thus an object of the present invention to provide a new and efficient method for the production of bis-hydroxyalkyl esters of a benzene dicarboxylic acid. It is also an object of the present invention to provide a process for the production of bis(2-hydroxyethyl) terephthalate from ethylene oxide and terephthalic acid which utilizes a novel and efficient reaction solvent. Additional objects will become apparent from the following description of the present invention.

The present invention in one of its embodiments is a process for the production of a bis-hydroxyalkyl ester of a benzene dicarboxylic acid wherein a benzene dicarboxylic acid is suspended in a nitrobenzene or nitrotoluene reaction medium and reacted with an alkylene oxide in the presence of a soluble catalyst.

DESCRIPTION OF THE PREFERRED EMBODIMENTS

The process of the present invention may be conducted in various manners and may be conducted in either a batch operation or the continuous process. In conducting the process, the benzene dicarboxylic acid, preferably in a finely divided form, is suspended by agitation in from about 1.0 to 15.0, preferably 2.5 to 6.0 times its weight of nitrobenzene or nitrotoluene and then reacted with the alkylene oxide in the presence of a catalyst. The diester product which is formed during the reaction, unlike the dibasic acid, is fairly soluble in nitrobenzene or nitrotoluene under the reaction conditions and therefore will generally be entirely soluble in the nitrobenzene or nitrotoluene reaction medium when sufficient amounts of the reaction medium are used. The temperatures to be used in the present invention may vary over a wide range from about 80 to 200° C. but are preferably from about 100 to 150° C. The pressures may range from subatmospheric to superatmospheric, about the only requirement being that the pressure be sufficient to maintain a liquid phase of nitrobenzene or nitrotoluene. Generally it might be stated that the pressures will range from about 1 to 30 atmospheres.

Generally the alkylene oxide will be present in amounts of from about 1.7 to 5 moles per mole of the dicarboxylic acid and is preferably present in amounts of from about 2 to 4 moles per mole of the dicarboxylic acid. The alkylene oxide used in the present process is preferably ethylene oxide while the preferred dicarboxylic acid is terephthalic acid although the present invention is not to be construed as limited thereto. Suitable alkylene oxides include those having from 2 to 6 carbon atoms such as 1,2-propylene oxide and 1,2-butylene oxide while other benzene dicarboxylic acids that may be used include o-phthalic acid and isophthalic acid.

In carrying out the reaction of the alkylene oxide with the diacid, it is preferable to terminate the reaction before all of the diacid has reacted. Of course, a bis-hydroxyalkyl ester may be produced practically regardless of the percentage of the diacid converted although best results are usually obtained when the residence time or reaction time is such that the reaction is terminated when from about 75 to 98% of the benzene dicarboxylic acid has been converted. The actual time required in the reaction zone will usually be from about 10 to 180 minutes.

The particular method for separating the bis-hydroxyalkyl esters from the effluent of the reaction zone does not constitute a part of the present invention and various methods will be apparent to those skilled in the art. The effluent will usually be comprised of alkylene oxide, unreacted solid dicarboxylic acid, the nitrobenzene or nitrotoluene reaction medium and the soluble diester product. Such as effluent can be treated for example by first flashing the alkylene oxide followed by removal of the solid diacid by filtration, and finally cooling of the remaining diester solution so as to crystallize the diester product. The crystallized diester can then of course be removed by filtration or the like. When crystallizing a bis-hydroxyalkyl ester of a benzene dicarboxylic acid from solution in nitrobenzene or nitrotoluene, the particular temperature to which the solution is cooled to effect crystallization is readily determined and will vary according to the particular diester being used and the particular liquid medium being utilized. For example when crystallizing bis(2-hydroxyethyl) terephthalate from nitrobenzene, it is preferred to cool to below 35° C. and preferably below 18° C. in order to insure optimum recovery of the diester. However, when crystallizing that same diester from p-nitrotoluene, the cooling generally needs only be to around 55–60° C.

The catalyst to be used in the present invention is one which is soluble,. i.e. the catalyst compound itself is soluble or forms soluble compounds, salts, complexes, etc. with the reactants used in the present process. Some specific classes of catalyst which may be used in the present invention are amines, arsines, stibines, phosphines, or quaternary ammonium compounds. The preferred catalysts are the amines especially the tertiary amines such as pyridine, triethylamine, tri-n-propyl amine, N, N-dimethylaniline, 2,6-dimethylpyridine and the like. Some other specific catalysts which may be used include propyl amine, hexyl amine, diethyl amine, piperidine, triethylphosphine, tripropylphosphine, diethylphenylphosphine, triphenylarsine, triphenylstibine, benzyl trimethyl ammonium hydroxide, decyl trimethyl ammonium hydroxide, and dodecyl trimethyl ammonium hydroxide. The amount of catalyst to be used in the process of the present invention should generally be from about 0.001 to 0.1 mole per mole of the terephthalic acid but is preferably from about 0.01 to 0.04 mole per mole of the terephthalic acid.

As between nitrobenzene and nitrotoluene, the nitrobenzene is the preferred reaction mdium for th process of the present invention. Nitrotoluene as used herein is intended to cover the para, meta, and ortho forms as well as mixtures of these. The para-nitrotoluene is the preferred of the nitrotoluenes.

The following examples is given to illustrate a specific embodiment of the present invention but not to limit the scope thereof.

EXAMPLE

Three runs were made in which a slurry of 2.25 moles of fiber grade terephthalic acid in 1000 ml. of liquid reaction medium was heated to 110° C. in a stirred 2-liter autoclave. The liquid medium in one run was nitrobenzene, in another chlorobenzene and in the other was xylene. Ethylene oxide (6.72 moles) was pumped in and then 0.068 mole triethylamine catalyst was added. After 90 minutes the reaction mixture was pressured through a hot (130° C.) nylon filter with nitrogen to retain the unreacted terephthalic acid. The filtrate was then cooled to about 25° C. so to precipitate the bis(2-hydroxyethyl) terephthalate product which was recovered, weighed and analyzed. In the run using nitrobenzene approximately 94% of the charged terephthalic acid was converted and the crude terephthalate product contained only about 0.99 mole percent diethylene glycol. In the run utilizing xylene, there was about 90% conversion of the terephthalic acid and about 1.56 mole percent diethylene glycol in the product while the run using chlorobenzene gave only about 85% conversion of the acid and gave a diester product containing about 0.78 mole percent diethylene glycol.

As may be seen from the foregoing example, nitrobenzene is a very good reaction medium for the production of bis-hydroxyalkyl esters of a benzene dicarboxylic acid, giving very good conversions and also a low dialkylene glycol content in the crude diester product. A low dialkylene glycol content in the diester product is necessary for some end uses of the diester, e.g. tire cord, and also indicates that less of the valuable alkylene oxide reactant has been converted to an unwanted product. Nitrobenzene and nitrotoluene also offer advantages over many other known reaction media because of the high solubility of bis-hydroxyalkyl esters in nitrobenzene and nitrotoluene. This high solubility is desirable because it allows one to use a high concentration of diacid in the feed to the esterification reactor and yet still obtain an effluent in which the diester product is entirely soluble. As has been pointed out above, the fact that the bis-hydroxyalkyl ester is soluble in the reaction medium while the terephthalic acid product is insoluble makes the separation of the effluent fairly easy.

The embodiments of the invention in which an exclusive property or privilege is claimed are defined as follows:

1. A process for the production of a bis-hydroxyalkyl ester of a benzene dicarboxylic acid, wherein a benzene dicarboxylic acid is suspended in a reaction medium and reacted with an alkylene oxide having from 2-6 carbon atoms in the presence of a soluble catalyst selected from the group consisting of an amine, arsine, stibine, phosphine, and quaternary ammonium compound, said reaction medium being comprised of nitrobenzene, nitrotoluene, or mixtures thereof.

2. A process according to claim 1, wherein said alkylene oxide is a 1,2-alkylene oxide having from 2 to 6 carbon atoms.

3. The process of claim 1 wherein said process is carried out at a temperature of from about 80 to 200° C.

4. The process of claim 1 wherein ethylene oxide is reacted with terephthalic acid to produce bis(2-hydroxyethyl) terephthalate.

5. The process of claim 4 wherein the temperature is from 80 to 200° C. and wherein the liquid medium is nitrobenzene.

6. The process of claim 4 wherein the ethylene oxide is present in amounts of from about 1.7 to 5.0 moles per mole of terephthalic acid.

7. The process of claim 4 wherein the liquid medium is present in amounts of from about 1.0 to 15.0 times the weight of the terephthalic acid.

8. The process of claim 7 wherein the temperature is from 100 to 150° C. and the ethylene oxide is present in amounts of from 2 to 4 moles per mole of terephthalic acid.

9. The process of claim 8 wherein the catalyst is a tertiary amine.

10. The process of claim 9 wherein the liquid reaction medium is nitrobenzene.

11. The process of claim 10 wherein the terephthalic acid is suspended in from about 2.5 to 6.0 times its weight of nitrobenzene.

12. The process of claim 10 wherein the reaction is terminated when from about 75 to 98% of the terephthalic acid has been converted.

13. A process for preparing bis(2-hydroxyethyl) terephthalate, wherein terephthalic acid is suspended in nitrobenzene and reacted with ethylene oxide in the presence of a soluble catalyst selected from the group consisting of an amine, arsine, stibine, phosphine, and quaternary ammonium compound at a temperature of from 80 to 200° C. and wherein the nitrobenzene is present in amounts of from 1.0 to 15.0 times the weight of terephthalic acid.

14. A process according to claim 13, wherein said soluble catalyst is triethylamine.

References Cited

UNITED STATES PATENTS

| | | | |
|---|---|---|---|
| 3,037,049 | 5/1962 | Vaitekunas | 260—475 |
| 3,397,224 | 8/1968 | Fujita et al. | 260—475 |
| 3,459,788 | 8/1969 | Enoki et al. | 260—475 |

FOREIGN PATENTS

| | | | |
|---|---|---|---|
| 1,466,001 | 12/1966 | France | 260—475P |
| 1,246,708 | 8/1967 | Germany | 260—475P |

LEWIS GOTTS, Primary Examiner

E. J. SKELLY, Assistant Examiner

PO-1050
(5/69)

UNITED STATES PATENT OFFICE
CERTIFICATE OF CORRECTION

Patent No. 3,590,071      Dated June 29, 1971

Inventor(s) Donald R. Larkin

It is certified that error appears in the above-identified patent and that said Letters Patent are hereby corrected as shown below:

Please correct the following errors:

On page 1, column 1, line 44, replace "6,506,200" with --6,506,220--.

On page 1, column 2, line 11, replace "unike" with --unlike--.

On page 2, column 3, line 47, replace "0.99" with --0.09--.

Signed and sealed this 23rd day of May 1972.

(SEAL)
Attest:

EDWARD M. FLETCHER, JR.      ROBERT GOTTSCHALK
Attesting Officer      Commissioner of Patents